A. L. MURRAY.
DEVICE FOR SHAPING AND VULCANIZING AUTOMOBILE TIRE PATCHES.
APPLICATION FILED MAR. 15, 1918.
1,274,073.
Patented July 30, 1918.
2 SHEETS—SHEET 1.
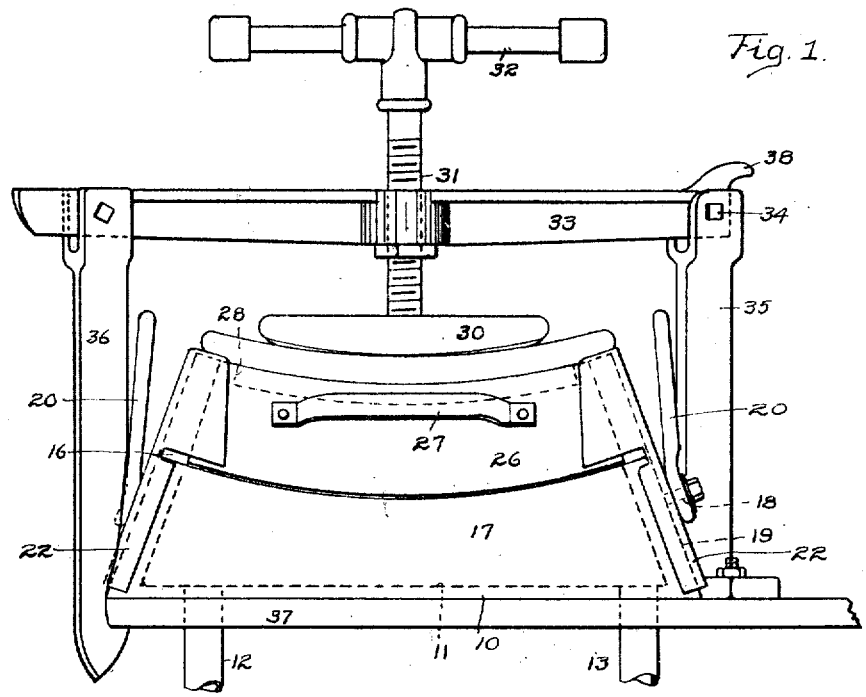
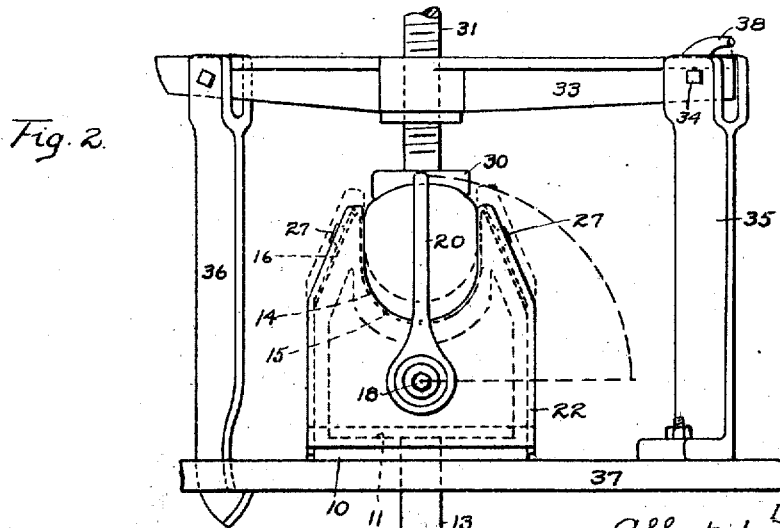
INVENTOR.
Albert L. Murray
BY Edwin M. Hulse
ATTORNEY.

A. L. MURRAY.
DEVICE FOR SHAPING AND VULCANIZING AUTOMOBILE TIRE PATCHES.
APPLICATION FILED MAR. 15, 1918.
1,274,073.
Patented July 30, 1918.
2 SHEETS—SHEET 2.
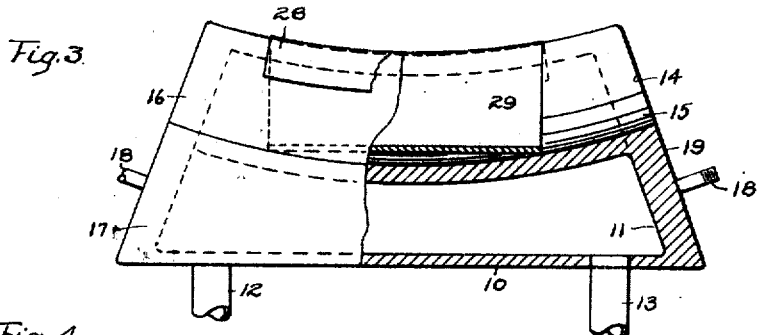
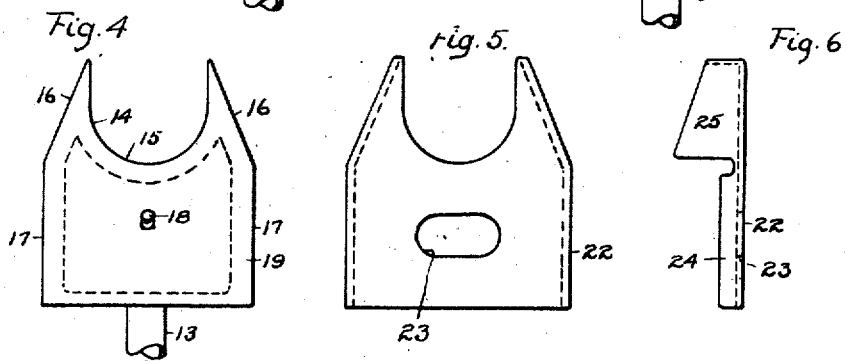
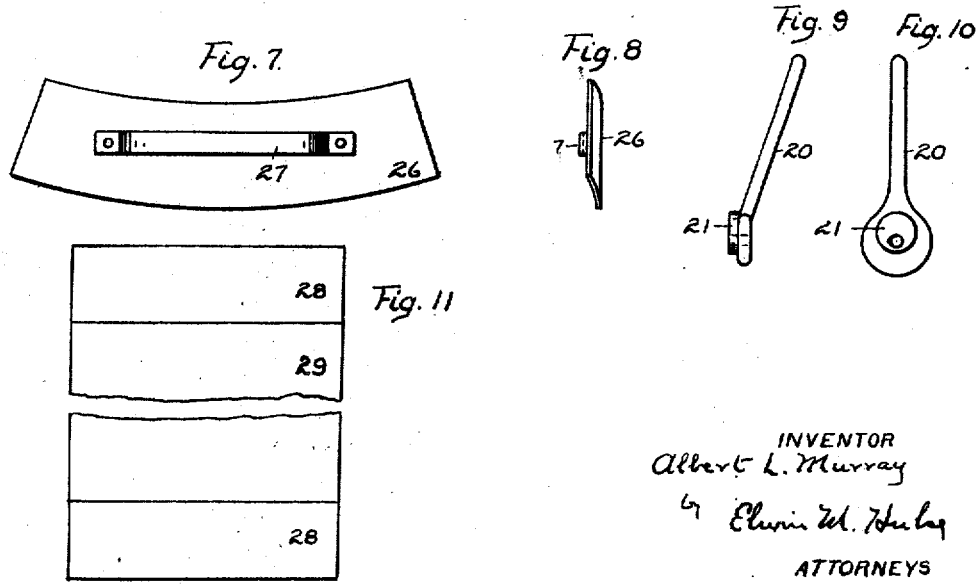
INVENTOR
Albert L. Murray
by Elvin W. Huley
ATTORNEYS

UNITED STATES PATENT OFFICE.

ALBERT L. MURRAY, OF AUBURN, INDIANA, ASSIGNOR TO THE DOUBLE FABRIC TIRE COMPANY, OF AUBURN, INDIANA, A CORPORATION.

DEVICE FOR SHAPING AND VULCANIZING AUTOMOBILE-TIRE PATCHES.

1,274,073.   Specification of Letters Patent.   Patented July 30, 1918.

Application filed March 15, 1918. Serial No. 222,615.

*To all whom it may concern:*

Be it known that I, ALBERT L. MURRAY, a citizen of the United States, residing at Auburn, in the county of Dekalb and State of Indiana, have invented new and useful Improvements in Devices for Shaping and Vulcanizing Automobile-Tire Patches, of which the following is a specification.

The invention relates to devices for shaping and vulcanizing automobile tire patches. It is desirable that patches for use in temporarily repairing a tire casing shall conform to the contour of the casing so that it shall snugly fit the same when it is applied.
Prior to my invention it was difficult in forming the patch from a previously built-up flat unit of several plies to prevent its wrinkling or the separation of its plies of rubberized fabric. The only previously known means of preventing the separation of the plies or the forming of wrinkles therein has been, in the building of the raw patch, to use a much greater proportion of costly new rubber in rubberizing the fabric than is necessary in the finished article, or to expend excessive time and labor in attempting to iron out the wrinkles in the finished article, which wrinkles must be removed to prevent injury to the patch or to the inner tube in use.

The object of my invention is to provide simple and novel means by which the patch may be shaped and vulcanized with great rapidity and with entire absence of wrinkles or separation of its plies.

In the accompanying drawings I illustrate one manner in which the invention is capable of being carried out in practice, in which—
Figure 1 is a side elevational view of the device; Fig. 2 an end view of the same; Fig. 3 a broken away side elevational view of the mold; Fig. 4 an elevational view of one end of the same, Fig. 5 an elevational view of an end clamping plate; Fig. 6 a side view of the clamping plate; Fig. 7 an elevational view of one of the spring plates; Fig. 8 an end view of the same; Fig. 9 is a side view of one of the levers and Fig. 10 an elevational view of the same; Fig. 11 a plan view, partly broken, of a raw patch.

Referring to the drawings, 10 is the body of the mold having a steam jacket 11 therein to which pipes 12 and 13 are connected for supplying steam to heat the mold. Recess or cavity 14 is formed in the mold and is adapted to receive the patch to be shaped and vulcanized. The bottom wall 15 of the cavity is concave both transversely and longitudinally to correspond to a pneumatic tire casing. The upper portion 16 of each outer wall 17 of the mold is beveled or inclined inwardly toward its upper edge and the upper edges of both portions are concaved longitudinally similarly to bottom 15. A fixed pin 18 projects outwardly from each end wall 19 of the mold and upon this pin is revolubly mounted a lever 20 having on its inner face a cam 21. A plate 22 is loosely engaged on each end of the mold and is provided with aperture 23 within which cam 21 is operative to raise and lower the plate according as lever 20 is rocked. Lateral flanges 24 on the side edges of the plate bear upon walls 17 of the mold and flanges 25 arranged at the side edges of the upper portion of the plate, are inclined to correspond to the inclination of portions 16 of walls 17 and from which portions they are spaced sufficiently to permit of the insertion of the ends of spring plates 26. Plates 26 are formed of relatively thin material and are curved longitudinally and when their ends are engaged behind flanges 25 the convex surface thereof abuts portions 16 of walls 17. Handles 27 attached to the plates afford easy handling of the plates. These plates serve as resilient members which, when clamping plates 22 are drawn down by levers 20, are pressed into tight contact with the sides of the mold or with any material placed between the plates and the walls of the mold, the central portion of each plate, due to its convexity, gripping the central portions of the material that is, the central portions of flaps 28 of the raw patch 29 which lie between the plates 26 and portions 16 of walls 17 of the mold.

A plunger 30 carried by screw 31 having an operating handle 32 is adapted to be driven up and down by the rotation of the screw. The screw is threaded into a cross-arm 33 pivoted at 34 to standard 35. Latch 36 is pivoted to the other end of the cross arm and is adapted to be engaged under a fixed object such as the top 37 of a table which supports the device. Lug 38 on the opposite end of the cross-arm serves as a stop which abuts standard 35 when the cross-arm is elevated on its pivot 34 and thereby supports the cross-arm and the plunger and latch in elevated position.

In operation the raw patch 29, which has been previously built up of the desired number of rubberized plies of material and having flaps 28 at its side edges, is laid into the hot mold. A suitable device, such as a tightly stuffed sand bag is then inserted within the patch and so handled by the operator as to press down the ends of the patch upon the wall of the mold. The said wall being hot the ends of the patch immediately adhere to it. The sand bag is then removed and as the bottom of the cavity is concave longitudinally only the ends of the patch adhere to it, the remainder being free from adhesive contact with the wall. The flaps of the patch are then drawn over the upper edges of the mold and onto portions 16 of walls 17. Plates 22 being in their uppermost position and handles or levers 20 in horizontal position, spring plates 26 are next engaged under flanges 25 of plates 22 with their convex central portions in contact with flaps 28 and levers 20 are rocked to vertical position. This movement of the levers draws plates 22 downwardly and they in turn draw down on spring plates 26 and the latter in turn draw down on flaps 28. When the levers are in upright position the spring plates will grip the flaps tightly and firmly hold them on inclined walls 16. A suitable sand bag is then inserted within the patch and plunger 30 is lowered and driven down upon the bag to force it against the patch and stretch the patch both longitudinally and transversely into contact with the wall of cavity 11. Since the patch has been previously engaged at its ends to the wall of cavity 11 and its side edges are firmly held to the mold by spring plates 26 the pressure of the sand bag upon the portion of the patch between its ends and side edges must necessarily stretch to make contact with the wall of the cavity. The raw patch in its stretched condition is permitted to remain in the heated mold a minute or two until vulcanization is complete whereupon the plunger is released and the levers 20 are turned down to release spring plates 26 and the sand bag and finished patch are removed and another raw patch inserted and the operation repeated. In this manner a raw patch is shaped and vulcanized with great rapidity and entirely free from separation of the plies of rubberized fabric of which it is composed or from wrinkles in any part of those plies, and since the plies of the patch are given no opportunity to separate or wrinkle up during the shaping and vulcanizing process I am enabled to use a less adhesive rubberizing compound in the fabric of the plies and thereby reduce the percentage of costly new rubber therein which, by other methods, would be necessary. A further gain is made by using a smaller percentage of new rubber in the rubberizing compound in that the patches can be made in about one-fourth of the time and with much less labor than is required for the production of similar patches by other processes.

What I claim is:

1. In a device of the class described the combination of a body having a cavity therein, the bottom wall of the cavity being concave longitudinally and transversely, means to heat the body, two spring plates adapted to be engaged on opposite sides of the body and means to force the spring plates toward the said opposite sides of the body.

2. In a device of the class described the combination of a body having a cavity therein, the bottom of the cavity being concave longitudinally and transversely, a steam jacket within the body and adapted to heat the same, two spring plates adapted to be engaged on opposite sides of the body and reciprocable means adapted to engage the spring plates for forcing them toward said opposite sides of the body.

3. In a device of the class described the combination of a body having a cavity therein, the bottom of the cavity being concave longitudinally and transversely, a steam jacket within the body adapted to heat the same, two members adapted to be engaged on opposite sides of the body, a clamping plate reciprocably mounted at each end of the body and adapted to engage the two members for forcing them toward the body, and means to raise and lower the clamping plates.

4. In a device of the class described the combination of a body having a cavity therein, the bottom wall of the cavity being concave longitudinally and transversely, a steam jacket within the body adapted to heat the same, the upper portion of two opposite side walls of the body being inclined inwardly toward the upper edges thereof, two members adapted to be engaged on said inclined portions of said walls and means to force the said members toward the said inclined portions for the purposes described.

In witness whereof I hereunto subscribe my name this 28th day of February, 1918.

ALBERT L. MURRAY.